This invention relates to the recovery of vanadium from acid solutions by solvent extraction, and to the determination of vanadium present in trace amounts in other metallic materials, particularly aluminous materials.

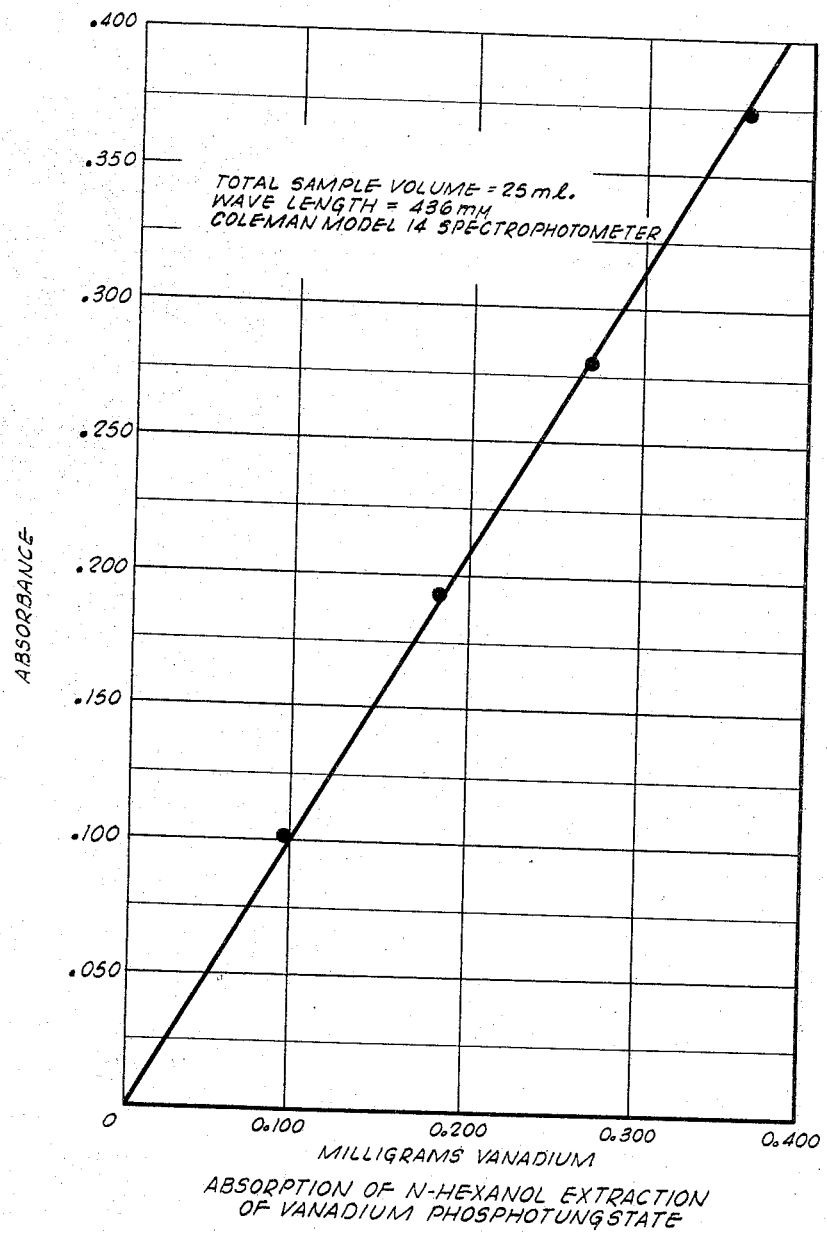
ABSORPTION OF N-HEXANOL EXTRACTION
OF VANADIUM PHOSPHOTUNGSTATE
INVENTORS
DONALD G. BIECHLER &
DONALD E. JORDAN
AGENT 3,345,126
EXTRACTION AND DETERMINATION OF VANADIUM
Donald G. Biechler, Grandview, Mo., and Donald E. Jordan, Ponca City, Okla., assignors to Continental Oil Company, Ponca City, Okla., a corporation of Delaware
Filed June 17, 1963, Ser. No. 288,330
22 Claims. (Cl. 23—18)

It is frequently desired to separate vanadium from various ores in which it occurs, or from various refined metals or metal compounds in which it is present as an impurity. In either case, the desirability of recovering the vanadium may be based upon the value of the pure vanadium metal, and the desirability of segregating from the metal, less desirable materials which reduce the value of the vanadium. In the case of the removal of the vanadium as an impurity from refined metals or metal compounds, the primary reason for such separation will frequently be the interference offered by the vanadium to the intended or desired function of the refined metal or metal compound. Because the vanadium can often be tolerated in such materials in certain minimal amounts, it is further desirable to be able to accurately, economically and quickly determine the amount of vanadium which is present in such materials in order to become informed of whether such tolerance is exceeded.

As an example of the need for effective separatory techniques for recovering vanadium from naturally occurring ores may be mentioned the phosphate industry. The large phosphate deposits of certain Western States contain substantial amounts of vanadium and the commercial demand for the latter material is such that it is an extremely valuable by-product of the production of phosphate from such ores. Examples of the need for good separatory processes for enabling small or trace amounts of vanadium to be effectively removed from other metals or chemicals include the processing of uranium, the purification of reagent grade chemicals, the removal of traces of vanadium from high purity aluminum which it is desired to use as a catalyst or as a reactant in certain organometallic reactions, and the determination of vanadium in crude oils and catalytic cracking charge stocks.

A number of methods for separating vanadium from other materials in which it occurs in trace amounts and larger quantities have heretofore been proposed. Several analytical methods have also been utilized for determining trace or microgram amounts of vanadium in the presence of other metallic ions. Many of these procedures employ the step of forming a pentavalent vanadium complex compound which can be at least partially extracted with a suitable solvent, or can be separated by precipitation from the solution in which the complex is formed. The previous separatory and analytical methods each have disadvantages which distract from the universality of their usefulness. For example, many of the solvents which have been proposed for extraction of pentavalent vanadium compounds do not completely or consistently extract the vanadium from the solution in which it is contained. Moreover, the form in which the vanadium is extracted frequently does not permit the extract to be subjected to simple and rapid analysis, or, in some instances, extraneous undesirable materials are extracted with the vanadium which interfere with subsequent analysis or render the analysis inaccurate.

In some of the analytical procedures proposed, the pentavalent vanadium is complexed with other materials, and the vanadium determined by colorimetric methods while the vanadium is still present in the original solution. One of the most successful of these methods, insofar as the determination of trace amounts of vanadium is concerned, is based upon the formation of a phosphotungstovanadate complex in an acid solution by the addition to an acidic solution of pentavalent vanadium, of phosphoric acid and a suitable tungstate salt. The complex, the precise chemical nature of which is obscure, is a stable yellow color and the vanadium content of the solution from which it is derived is generally determined by spectrophotometric procedures while the complex remains in the original sample solution. The latter aspect of the analytical procedure does not, of course, lend itself to the separation or removal of the vanadium from the other materials in the sample, and while the analysis is recognized to be characterized by excellent accuracy and repeatability, other or additional procedures must be adopted if the vanadium is to be recovered from the sample. Thus, in summary, in many instances, the analytical technique adapted does not ultimately result in the separation of the vanadium from the material in which it occurs, and conversely, the separatory technique does not place the vanadium in a state suitable for analysis, or else concurrently with the extraction of the vanadium, extracts other materials which interfere with the vanadium analysis. Moreover, the analytical techniques heretofore proposed generally are not both rapid and accurate.

It is an object of the present invention to provide a method for efficiently extracting vanadium from other materials in which it occurs.

Another object of this invention is to provide a method for efficiently extracting small quantities of vanadium from other materials in a form in which it may be quickly and accurately analytically determined.

A further object of the present invention is to provide a method by which vanadium can be converted to a pentavalent vanadium compound susceptible to spectrophotometric optical density measurements, and can be efficiently extracted in this form from the material in which it occurs.

An additional object of the present invention is to provide a selective and efficient extraction agent which may be used to completely extract small quantities of vanadium from various materials.

A more specific object of the invention is to increase the purity of high purity aluminum powder by removing trace amounts of vanadium therefrom.

Yet another object of the present invention is to provide an effective, rapid and economical method for determining trace amounts of vanadium in aluminum metal and aluminum compounds.

In addition to the foregoing described objects and advantages, other objects and advantages will become apparent as the following detailed description of the invention is read in conjunction with the accompanying drawing which illustrates the manner in which the optical density of an alcoholic solution of a vanadium complex derived from the practice of the present invention varies as the concentration of vanadium in the solution varies.

Summarily described, this invention provides a method for efficiently separating vanadium from vanadium-containing materials, and in one of its aspects contemplates the analytical determination of the amount of vanadium so separated. In the practice of the invention, the vanadium-containing sample is dissolved in a suitable acid or mixture of acids and the vanadium is then oxidized to the pentavalent state by the use of suitable oxidizing agents. Either prior to or after the oxidation of the vanadium to the pentavalent state, phosphoric acid and a suitable tungstate salt are added to the solution to form the phosphotungstate complex of vanadium to which reference has hereinbefore been made. The complex thus formed is extracted from the acid solution using aliphatic alcohols containing from 6 to 12 carbon atoms. The vanadium in the alcoholic extract is then determined colorimetrically by use of a photoelectric colorimeter or spectrophotometer.

A salient feature of the invention as broadly outlined in the preceding paragraph resides in the discovery that the vanadium complex of phosphotungstic acid may be efficiently extracted from the acid solution in which the complex is formed into aliphatic alcohols containing from 6 to 12 carbon atoms. It has been found that the complex may be substantially completely extracted with these solvents without concurrent solution in the alcohols of any appreciable amount of the acid solution. In the case of samples containing from about 4 parts per million to about 150 parts per million of vanadium, the vanadium complex is completely extracted in the specified alcohols and little or none of the acid solution is dissolved in the alcohol phase. The formation of the complex and subsequent extraction with alcohols of the described type therefore constitutes, in the latter case, a basis for determining with a high degree of accuracy and repeatibility the amount of vanadium present in samples which do not contain excessive amounts of interfering ions of the type heretofore well recognized in the art, such as chromium, iron, nickel, titanium, molybdenum and tungsten. The method is especially useful in determining trace amounts of vanadium in high purity aluminum metal.

Although the use of oxygenated organic solvents for the extraction of heteropoly acids from acid solutions has heretofore been suggested, the research culminating in the present invention has revealed that many oxygenated organic solvents either do not completely extract the vanadium phosphotungstate from acid solutions, or else are mutually soluble with the acid solution resulting in the extraction of a portion of the acid solution, which in turn results in the color of the complex becoming unstable and therefore not susceptible to subsequent colorimetric methods of analysis. Only alcohols of the prescribed character were found effective to completely extract the vanadium phosphotungstate complex without the occurrence of any degree of mutual solubility between the alcohol and aqueous-acid phases. Among the oxygenated organic solvents which were tested and found ineffective in performing the extraction of the complex were amyl acetate, ethyl acetate, cyclohexanone, ethyl aceto-acetate, n-butanol, amyl alcohol, ethyl ether and acetyl acetone.

The general procedures which may be employed for the formation of the vanadium phosphotungstate complex in acid solution are well understood in the art. However, certain of these procedures are preferred, and within the heretofore known procedures which are preferred, certain modifications have been found especially suitable for use in the practice of the present invention.

At the outset of the process of the invention, the vanadium-containing material from which the vanadium is to be extracted is placed in solution using sulfuric acid, or a suitable mixture of sulfuric acid with hydrochloric and/or nitric acid. The particular acid or mixture of acids selected will depend upon the solubility in the several acids of the various materials contained in the sample. In many instances, it will be desirable to use hydrochloric and/or nitric acid in addition to the sulfuric acid in order to solubilize certain metallic materials which are substantially insoluble in the sulfuric acid. The function of the hydrochloric and nitric acids is primarily, therefore, that of sample solubilization with secondary emphasis upon the oxidizing effect of the aqua regia formed by mixing the acids, or experienced in some instances when nitric acid alone is employed. As will become apparent in the procedure described hereinafter, these acids are volatilized from the sample solution and the metal values of the sample are converted to sulfates as the process progresses. In general, the complete removal of the more volatile solubilizing acids will be indicated by the evolution of white sulfur trioxide fumes upon heating the solution for a sufficient period of time.

The amount of sulfuric acid employed should, in general, be at least 2 times, and is preferably, from about 3 to about 8 times the amount of acid required to stoichiometrically convert all of the metal values of the sample to sulfate salts. The excess acid is necessary to compensate for the amount of volatilization of the acid which occurs in removing the more volatile solubilizing acids and in accomplishing the subsequent oxidation of vanadium to the pentavalent state by boiling the sample solution after a suitable oxidizing agent has been added thereto. Moreover, it is desirable that a small amount of free sulfuric acid exist in the sample solution immediately prior to the addition of phosphoric acid thereto in order that the acidity of the solution may be more easily raised by the addition of a relatively small excess of phosphoric acid to the optimum range for formation of the vanadium phosphotungstate complex.

The amounts of the other acids which may optionally be used conjunctively with the sulfuric acid are not critical, provided only that an amount is used which is sufficient to effect the desired solubilization of the sample and yet which is small enough to assure complete removal thereof by volatilization in a relatively short period of heating the sample.

After the sample has been placed in solution, the solution is heated to remove the nitric and/or hydrochloric acids, if these have been employed. Whether the latter acids have been used conjunctively with the sulfuric acid or not, the sample solution is preferably boiled until dense white fumes of sulfur trioxide are evolved. At this time, the heating of the sample is terminated, and in all cases, the solution should be removed from the heat before its volume is reduced to the point where precipitation of the dissolved salts commences.

At this point in the procedure, substantially all of the vanadium in the sample will have been converted to the vanadium sulfate and the vanadyl ions are in the tetravalent state. It will thus be apparent that, to form the pentavalent vanadium phosphotungstate complex, the steps of (a) oxidizing the vanadium from $V^{IV}$ to $V^V$, and (b) introducing phosphoric acid and a tungstate salt to the solution must next be carried out. The order in which these steps occur is generally not critical, although when certain types of oxidizing agents are employed, it may be preferable to add the phosphoric acid and tungstate salt prior to the addition of the oxidizing agent.

A number of types of oxidizing agents may be used with varying degrees of effectiveness in the practice of the present invention. These include, but are not limited to, ceric sulfate, alkali metal permanganates, alkali metal iodates, alkali metal bromates, alkali metal bismuthates, alkali metal and ammonium persulfates, hydrogen peroxide, sodium chlorate, alkali metal nitrates and calcium hypochloride. It is preferred to employ an oxidizing agent selected from the group consisting of alkali metal chlorates, alkali metal bichromates and alkali metal permanganates. Of these, the most suitable agent has been found to be potassium or sodium permanganate. In utilizing the permanganate to oxidize the vanadyl ions to the pentavalent state, the permanganate may be added to the sample solution either prior to or after the addition of phosphoric acid and a tungstate salt to the solution for the purpose of forming the complex.

It is important in the analytical determination of vanadium that any chloride ions which may be present in the sample solution be removed therefrom by volatilization prior to the addition of the oxidizing agent since such ions may have the effect of reducing both the oxidizing agent and also the vanadium from the pentavalent to the tetravalent state.

The oxidizing agent is added to the sample solution in an amount which is very slightly in excess of that which is required to oxidize all of the oxidizable ions in the solution to their maximum valence state. This may best be effected by using relatively dilute aqueous solutions of an oxidizing agent, such as potassium permanganate, and adding the reagent to the sample solution dropwise. In the case of dilute permanganate solutions, the last drop which should be added to the solution imparts a pink characteristic permanganate color to the solution which persists for about 4 minutes. When aqueous sodium permanganate solution is added to the reaction mixture, the solution may range from about 1/10 percent by weight to about 4 percent by weight in concentration. The permanganate is added to the sample solution during boiling and desirably after the original solution has been diluted with from about 3 to about 10 volumes of distilled water.

After the first relatively permanent pink color has been imparted to the solution by the dropwise addition of permanganate (or after a slight excess of other suitable oxidizing agent is added), the slight excess of the oxidizing agent in the solution is discharged by adding a very small quantity of hydrochloric acid to the solution. This amount may conveniently be 1 drop of 3 N hydrochloric acid. The undesirable effect of the chloride ions in the solution may then be eliminated by adding 1 drop of the dilute permanganate solution to the reaction mixture. This prevents the reduction of the vanadium ions from the pentavalent to the tetravalent state by the chloride ions in the solution. A brown rather than a pink color at this point indicates that too much HCl has been added and the procedure in this paragraph should then be repeated in order to obtain the desired pink color.

Instead of employing a small quantity of relatively dilute hydrochloric acid for discharging the excess oxidizing agent, the removal of such excess may also be effected by adding a suitable azide compound, such as sodium azide ($NaN_3$) to the solution and then continuing to boil for a few minutes. As another alternative, the excess oxidizing agent may be destroyed by adding a drop of dilute sodium nitrite to the solution and then removing the small excess of nitrous acid which is formed by adding to the solution a small amount of urea.

In general, procedures which are operable to substantially completely oxidize all of the oxidizable ions in the sample solution to their maximum valence state are well known in the art, and those hereinbefore described merely constitute procedures which we have found preferable for use in the present invention. The described preferred procedures are not to be understood as those which must exclusively be used, it being the primary and basic teaching of the present invention that all of the vanadyl ions in solution must be oxidized to and retained in the pentavalent state preparatory to forming therewith the phosphotungstate complex.

As has been hereinbefore indicated, the phosphoric acid and tungstate salt which are added to the sample solution for the purpose of forming the vanadium phosphotungstate complex may, when permanganate is used as the oxidizing agent, be added either prior to or after the addition of the permanganate. In the addition of phosphoric acid to the sample solution, a substantial excess of phosphoric acid over that which is stoichiometrically required to complex all of the vanadium is introduced to the solution. It is usually preferred to add from 4 to 8 times the approximate stoichiometric requirement of phosphoric acid. The hydrogen ion concentration of the solution is then adjusted by the addition of water thereto in an amount sufficient to bring the normality of the sample solution to within the range of from about 3 M to about 7 M in hydrogen ion concentration (pH—0.48 to pH—0.85). In lieu of the described procedure, however, the amount of phosphoric acid which is added to the sample solution may be only slightly in excess of the approximate stoichiometric requirement to complex all of the vanadium in the solution and the normality of the solution may then be adjusted by the addition of small amounts of sulfuric acid. The main consideration in this step of the procedure is that adequate assurance exists of the complexing with the phosphoric and tungstic acids of all of the vanadium which is present, and the adjusting of the total hydrogen ion concentration of the sample solution to within the preferred range for formation of the complex. If the solution is not within the preferred range, a tendency exists for other vanadium compounds to be formed in the solution which are inefficiently extracted with the aliphatic alcohols hereinbefore described.

Following the addition of phosphoric acid to the sample solution, an amount of a suitable tungstate salt which is from 2 to 4 times the stoichiometric requirement for formation of the complex is added to the sample solution. It will generally be preferred to add the equivalent of from about 0.22 to about 0.26 gram of sodium tungstate for each 15 ml. of 85 percent orthophosphoric acid solution added to the sample solution.

The particular type of tungstate salt which is added to the sample is not critical to the practice of the invention, the only requirement being that such salt be completely soluble in the sample solution. All of the alkali metal tungstates may be used, and a preferred tungstate reagent for use in practicing the invention is a 0.5 molar solution prepared by dissolving 16.5 grams of sodium tunstate dihydrate in enough distilled water to make 100 ml. of solution. The sodium tungstate solution is preferably added to the sample solution after the same has been heated to boiling, while the phosphoric acid reagent may be added either while the solution is hot or while it is at ambient temperatures.

Following the oxidation of vanadium to the pentavalent state and the addition to the sample solution of the phosphoric acid and tungstate complexing agents, the solution is allowed to cool and the formation of the complex is evidenced by the development of a uniform and persistent yellow color in the sample solution.

The next operation in the practice of the present invention entails the extraction of the vanadium phosphotungstate complex from the acid solution in which it is formed. Although many of the analytical methods for determining vanadium heretofore proposed have relied upon colorimetric methods in which the absorbance of the complex is determined while the complex remains in the acid solution in which it is developed, the accuracy of such methods has been decreased by the relatively low concentrations of the complex in the acid solution which generally characterize such in-situ determinations. A relatively low concentration of the complex constitutes a disadvantage in such colorimetric determinations since the monochromatic absorbance of the complex at those wave lengths which are substantially free of absorbance by other metallic compounds is relatively low. Because of the efficiency of the aliphatic alcohol extraction agents used in the present invention, substantially all of the complex may be extracted from the acid solution into a relatively small volume of alcohol with the result that the sensitivity of the colorimetric method is vastly improved at wave lengths at which the absorbance is relatively low. It is thus possible, for example, to spectrophotometrically accurately determine the amount of vanadium in the alcoholic extract using a wave length of 436 m$\mu$, at which wave length a minimum of interference occurs as the result of light absorption by chromium and molybdenum compounds, even though the amount of light absorbance by the yellow vanadium phosphotungstate complex at this wave length is substantially lower than its absorbance at lower wave lengths where much greater interference from iron, chromium and molybdenum compounds occurs.

Aside from the improvement in accuracy and repeatability which is achieved in the analytical determination of vanadium as the result of the efficient extraction used in the present invention, the extraction also permits entire or substantial quantities of vanadium to be removed from vanadium-containing materials on a commercial basis. As hereinbefore indicated, substantially complete extraction of vanadium concentrations up to about 150 parts per million can be obtained through the employment of the present invention and major portions of the vanadium present can be extracted at substantially higher concentrations. The extraction, when employed for commercial separation purposes, may be carried out as a single pass extraction, or a plurality of extractions may be used in accordance with procedures well understood in the art. Any of the aliphatic alcohols containing from 6 to about 12 carbon atoms may be employed, and the molecular structure of such alcohols may be of the straight chain or normal type, or the branched chain isomers of the alcohols may be used. Suitable alcohols for use in performing the extraction of the invention include, but are not limited to, n-hexanol, n-heptanol, n-octanol, n-nonanol, n-decanol, n-undecanol, n-dodecanol, 2-methyl-1-pentanol, 2-ethyl-1-butanol, 4-methyl-2-nonanol, 2-ethyl-3-methyl-1-octanol, 4-methyl-3-undecanol, 4-dodecanol, 3-dimethyl-2-heptanol, 3-diethyl-2-octanol, 2 - methyl-3-nonanol, and 2-nonanediol.

In using the extraction for the commercial separation of vanadium from vanadium-containing materials, it will be understood that, in carrying out the extraction step, the specific conditions employed during the extraction will be regulated and controlled, as understood by those skilled in the art, with respect to the particular alcohol which is employed and the particuular acid solution from which the complex is to be extracted. Factors such as the method of contacting the alcohol with the sample solution, the temperature at which the extraction is carried out, and the volume ratio of alcohol to acid may be severely modified to secure the most efficient operation with the solvent chosen. In general, it is preferred to employ from about 0.3 to about 0.6 mole of the alcohol for each milligram of vanadium present in the sample which is to be subjected to treatment. The extraction may be carried out in a suitable vessel provided with heating and agitating means so as to assure intimate mixing of the solvent and the acid solution. Suitable means will, of course, be provided to accomplish the withdrawal of the stratified organic solvent layer from the extraction zone and the passage of the extract to subsequent processing zones.

It should be noted that in carrying out the extraction for other than analytical purposes, a plurality or mixture of the alcohol extracting agents may be employed, or several extraction steps may be carried out using different solvents in the several extractions if desired. In the case of analytical determinations, on the other hand, it is preferred for the sake of convenience and economy of operation to employ but a single alcohol in effecting the extraction.

As will be understood by those skilled in the art, when effecting the commercial separation of vanadium values from the acid solution, the solvent extract may be subjected to a variety of types of subsequent treatment for the purpose of recovering the vanadium from the solvent, and also for recovering the solvent with minimal losses. With solvent extraction processes of this type, it is, of course, theoretically possible to operate in a cyclic method with slight or no losses of the alcohol solvent. Actually, of course, there will be slight solvent losses due to the very small degree of solubility of the alcohols in the acid solution. This loss may be reduced, however, by heating the acid solution after completion of the extraction so as to distill off and recover the volatile alcohols. Alternatively, the residual alcohol contained in the acid solution may be recovered by treating the acid solution with other organic solvents which preferentially remove or abstract the alcohols from the acid.

Recovery of the vanadium from the alcohol extract may be accomplished by distilling off the alcohol leaving the vanadium compounds as a residue. It is preferred, however, to use chemical or physico-chemical methods of recovering the vanadium from the alcohol extract phase by precipitating it from the alcohol solution by procedures well understood in the art. Another method which may be employed is to extract the vanadium from the alcohol solution by converting the vanadium to a compound in which its valence is 4 rather than 5 and extracting this compound into water which is insoluble in the alcohols described. The stripped alcohol may then be recycled to the first extraction stage and the water extract distilled or otherwise treated to recover the vanadium compounds therefrom.

When the alcohol extraction is used for the analytical determination of trace amounts of vanadium, the sample solution is transferred after the formation of the complex therein to a suitable separatory funnel. Here it is preferably diluted with from about 1 to 2 volumes of distilled water and is then shaken with a small quantity of one of the aliphatic alcohols of the type hereinbefore described. In general, a minimum of about 15 ml. of the alcohool should be used for each 0.5 milligram of vanadium estimated to be present in the sample solution. Preferably, at least 20 ml. of the alcohol is employed for each 0.5 milligram of vanadium present in the sample. The alcohol and acid-aqueous phases are thoroughly intermixed by shaking and then are allowed to stratify until a well defined interface is formed between the organic and aqueous layers. The aqueous fraction is then removed and the alcohol extract is washed with a dilute sulfuric acid wash solution.

The concentration of vanadium in the extract phase is then determined colorimetrically using either a photoelectric photometer or a spectrophotometer using wave lengths in the range of from about 410 m$\mu$ to about 450 m$\mu$. Although maximum absorbance of the vanadium phosphotungstate complex occurs in the lower portion of the specified wave length range, it is preferred to determine the vanadium using a wave length of 436 m$\mu$ since the absorbance of certain interfering compounds of molybdenum, chromium, iron and tungsten is at a minimum at this wave length. When it is intended to measure the absorbance of the complex at 436 m$\mu$, a small amount of acetone is preferably added to the extract solution prior to the colorimetric measurement to solubilize small amounts of water in the extract and form a single phase. The acetone does not absorb at 436 m$\mu$ and therefore does not interfere with the determination.

In colorimetrically determining the vanadium in the alcohol extract, the absorbance values which are read on the particular instrument used are, as is the general and well known practice, compared with the values indicated for a particular absorbance by a standard curve developed using appropriate aliquots of a standard vanadium solution. The standard vanadium solution which is utilized for preparing the standard curve may be made by dissolving 0.0535 gram of reagent grade vanadium pentoxide in 50 ml. of 5 percent sodium hydroxide. This solution is then acidified with 10 ml. of 1:1 sulfuric acid and diluted to a volume of 1000 ml. Each milliliter of the solution thus prepared contains 0.030 milligram of vanadium. Standardization of the solution may be checked with sulfur dioxide and standardized potassium permanganate in the conventional manner.

In preparing the standard curve, appropriate aliquots of standard vanadium solution are pipetted into suitable containers and are then carried through the analytical procedure which has been detailed above for the determination of vanadium commencing with the addition of the acids which it is intended to use in dissolving the vanadium-containing sample. The absorbance read upon the colorimetric instrument employed is plotted versus the milligrams of vanadium in the various aliquots of standard solution. The standard curve has been observed to obey Beer's law and to display linearity for concentrations of vanadium up to 0.4 milligram as illustrated in the accompanying drawing.

The precision and accuracy of the analytical method provided by the present invention are excellent in the absence of interfering ions. Most of these ions have been identified by previous workers in the art and in cases where a possibility of interference exists, numerous techniques are known for removing such ionic species or masking their effect in the colorimetric determination. On the basis of the recovery of added vanadium, the method has been found to be quite accurate in the determination of trace quantities of vanadium ranging from about 4 to about 150 parts per million. In one of its most important applications, the method has been applied to the determination of trace amounts of vanadium in high purity aluminum metal and has been found to be characterized by an accuracy at the 0.061 milligram level of ±0.005 milligram and at the 0.305 milligram level of ±0.011 milligram. Vanadium in concentrations from as low as 0.0004 percent by weight to as high as 0.015 percent by weight in aluminum of 99.9 percent purity has been determined within the accuracy indicated. When the described method of determining vanadium is employed, it has been found that a time saving of nearly 50 percent is realized over the time which is required to conduct a gravimetric cupferron method of vanadium analysis of the same samples.

The following example and tables are illustrative of the practice of the invention in separating and analytically determining small amounts of vanadium occurring in high purity aluminum metal by the practice of the present invention:

Example 1

A series af analyses of 2.5 gram and 5 gram samples of high purity aluminum powder, to some of which known amounts of vanadium were added, were conducted to determine the accuracy and repeatability of the analytical method of the invention. The aluminum powder employed was assayed at 99.9 percent pure aluminum with the remainder consisting predominantly of trace metals including vanadium. The amount of vanadium present in the 5 gram samples was initially determined by a cupferron gravimetric determination for purposes of comparison with the vanadium values determined by the method of the invention.

The samples, either with or without added vanadium, were initially dissolved in a mixture of acids consisting of 250 ml. of 1:1 $H_2SO_4$ (1 part of water to 1 part of 36 N sulfuric acid), 200 ml. of concentrated nitric acid (15 N), 200 ml. of concentrated hydrochoric acid (12 N) and 350 ml. of water. Solution of the sample was effected by adding the acid mixture to the sample in 0.5 to 1.0 ml. increments until approximately 85 percent by volume of the sample was dissolved. Addition of the acid mixture was then continued until a total of from 165 to 180 ml. of the acid had been added to the solution. The sample solution was then heated to boiling and boiling was continued until dense white fumes of sulfur trioxide were evolved. At this point, the volume of the solution was approximately 50 ml.

The solution was next cooled and from about 13 to about 18 ml. of 85 percent orthophosphoric acid and about 150 ml. of distilled water were added to the solution. The solution was then heated to boiling with stirring and 1.5 ml. of 0.5 molar sodium tungstate solution was added to the sample. 4 percent sodium permagnanate was next added dropwise to the boiling solution until a permanent pink color was imparted to the solution which persisted for four to five minutes indicating that all of the oxidizable ions in the solution had been oxidized to their maximum valence state. The excess of the permanganate was then discharged from the boiling solution by the addition thereto of 1 drop of 1:4 hydrochloric acid (1 part of 12 N acid to 4 parts of water). 1 drop of 4 percent sodium permanganate was then added to the sample solution to impart a very faint pink color to the solution and assure that any chloride ions in the solution would not reduce the vanadium ions from the pentavalent to the tetravalent state.

The sample solution was then transferred to a 500 ml. separatory funnel and diluted with 350 ml. of distilled water. 18 ml. of normal hexanol was added to the separatory funnel and thoroughly contacted with the sample solution by shaking the mixture for 30 seconds. After allowing the mixture to stand quiescently for a period of from about 3 to 5 minutes, the aqueous phase was removed, and the normal hexanol extract was washed with 30 ml. of an acid wash solution made by diluting 47 ml. of 36 N sulfuric acid with 350 ml. of distilled water. The washed extract was transferred to a 25 ml. volumetric flask and the separatory funnel was rinsed with 4 to 5 ml. of normal hexanol and the rinse solvent added to the volumetric flask. 2 ml. of acetone were then added to the flask to clear the solution and form a single phase, and the contents of the flask then made up to volume with normal hexanol. The absorbance of the normal hexanol solution at 436 m$\mu$ was then read using a Coleman Model 14 spectrophotometer and employing matched silica 1 centimeter cells.

The milligrams of vanadium present in each of the samples were calculated using a standard curve prepared from reagent grade vanadium pentoxide. The standard vanadium solution used in developing the standard curve was prepared by dissolving 0.0535 gram of the vanadium pentoxide in 50 ml. of 5 percent sodium hydroxide. The caustic solution of the pentoxide was then acidified with 10 ml. of 1:1 sulfuric acid and diluted to 1000 ml. Each ml. of the solution so prepared contained 0.030 milligram of vanadium. Standardization of the solution was checked by conventional procedures employing sulfur dioxide and standardized potassium permanganate.

The data presented in Table I are the results obtained when a number of 5 gram samples of high purity aluminum powder were analyzed for vanadium using the method of the present invention and using the cupferron gravimetric analysis method. In the method of the present invention, the vanadium was extracted from the samples using n-hexanol, and the extract subjected to spectrophotometric analysis at 436 m$\mu$ wave length. Each of the values presented in the table is an average of three or more separate analyses.

TABLE I

| Sample No. | Milligrams of V by Cupferron | Milligrams of V, Hexanol Extraction |
|---|---|---|
| 1 | 0.002 | 0.055 |
| 2 | 0.205 | 0.348 |
| 3 | 0.055 | 0.090 |
| 4 | 0.355 | 0.440 |
| 5 | 0.030 | 0.077 |
| 6 | 0.002 | 0.020 |
| 7 | 0.490 | 0.730 |

The data in Table I show that consistently higher values of vanadium are obtained using the analytical method of the present invention than are obtained in the cupferron analysis.

In Table II data are tabulated which show that the repeatability and precision of the present invention using normal hexanol to extract the vanadium phosphotungstate complex are excellent. When the same samples were analyzed by the cupferron method, the repeatability of that method was found to be considerably poorer than the repeatability of the present invention.

TABLE II

| Sample No. | Determination | Sample Size, grams | Milligrams of Vanadium | Repeatability, Milligrams |
|---|---|---|---|---|
| 1 | A | 2.5000 | 0.175 | |
|   | B | 2.5000 | 0.175 | 0.174±0.001 |
|   | C | 2.5000 | 0.173 | |
| 2 | A | 2.5000 | [1] 0.363 | |
|   | B | 2.5000 | [1] 0.354 | 0.358±0.004 |
|   | C | 2.5000 | 0.368 | |
|   | D | 2.5000 | 0.371 | 0.370±0.002 |
| 3 | A | 5.0000 | 0.055 | |
|   | B | 5.0000 | 0.057 | |
|   | C | 5.0000 | 0.055 | 0.056±0.001 |
|   | D | 5.0000 | 0.057 | |

[1] Practical grade n-hexanol used for extraction; reagent grade n-hexanol used in all other runs.

Table III presents the results obtained when various quantities of vanadium were added to several different 5 gram samples of high purity aluminum powder. It may be seen that, in general, the recovery of the added vanadium and thus the accuracy of the method of the present invention were very good.

TABLE III

| Sample No. | Determination | Vanadium in Sample,[1] Milligrams | Vanadium Added, Milligrams | Total Vanadium Found,[2] Milligrams | Vanadium Recovered, Milligrams |
|---|---|---|---|---|---|
| 1 | A | 0.077 | 0.000 | 0.077 | |
|   | B |       | 0.061 | 0.139 | 0.062 |
|   | C |       | 0.183 | 0.267 | 0.190 |
|   | D |       | 0.305 | 0.383 | 0.306 |
| 2 | A | 0.090 | 0.000 | 0.090 | |
|   | B |       | 0.061 | 0.171 | 0.081 |
|   | C |       | 0.183 | 0.272 | 0.182 |
|   | D |       | 0.305 | 0.432 | 0.342 |
| 3 | A | 0.055 | 0.000 | 0.055 | |
|   | B |       | 0.061 | 0.115 | 0.060 |
|   | C |       | 0.183 | 0.247 | 0.191 |
|   | D |       | 0.305 | 0.354 | 0.299 |
| 4 | A | 0.020 | 0.000 | 0.020 | |
|   | B |       | 0.061 | 0.073 | 0.053 |
|   | C |       | 0.183 | 0.202 | 0.182 |
|   | D |       | 0.305 | 0.303 | 0.283 |

[1] Average of four separate determinations.
[2] Average of two determinations.

In addition to performing the method of the present invention using normal hexanol to extract the vanadium phosphotungstate from the sample being analyzed, a number of other alcohols were employed in different analyses. For purposes of comparison, several determinations using different alcohols were carried out using the same high purity aluminum powder sample. The results obtained with the different alcohols are set forth in Table IV.

Extractant employed: Milligrams of vanadium found
- n-Heptanol _____ 0.055
- n-Octanol _____ 0.057
- n-Nonanol _____ 0.056
- n-Decanol _____ 0.054
- n-Dodecanol _____ 0.052
- n-Hexanol _____ 0.056

From the foregoing results, it may be perceived that the present invention provides a method for efficienctly extracting vanadium from vanadium-containing materials, and in one of its aspects, provides a quantitative analytical method for determining trace quantities of vanadium to a high degree of accuracy with excellent repeatability and precision. The analytical method is rapid and relatively simple and is sufficiently sensitive that vanadium may be determined in metals such as high purity aluminum in quantities of from about 4 to about 150 parts per million.

Although the process of the invention has been described with a certain degree of particularity in order to convey, by example, a basic understanding of the invention sufficient to enable one of average skilled in the art to practice the invention, it is to be expected that the specific conditions and ranges of some parameters herein described may be altered in some degree without departure from the basic principles underlying the invention. It is also contemplated that other compounds and mixtures of compounds not specifically mentioned or described may be employed in the analytical procedure outlined, provided that equivalent effects are attributable to the use of such compounds to those which have been described as characterizing the use of the compounds hereinbefore enumerated as exemplary. For example, in the case of some types of samples in which it is desired to determine the vanadium content, it will be preferred to use perchloric acid as the primary or basic acid used to dissolve the sample rather than sulfuric acid. Other variations or changes in the materials employed and the conditions prevailing during the separation and/or determination procedure of the present invention will readily occur to those skilled in the art. It is therefore intended that alterations and modifications in the process conditions and materials used herein which do not ential an abandonment of the basic principles upon which the invention is bottomed shall be considered as circumscribed by the spirit and scope of the invention except as the same may be necessarily limited by the appended claims or reasonable equivalents thereof.

What is claimed is:

1. A method for removing vanadium from a vanadium-containing material comprising:
   (a) dissolving the vanadium-containing material in an inorganic acid selected from the group consisting of sulfuric acid, hydrochloric acid, nitric acid and mixtures thereof;
   (b) oxidizing the vanadyl ions in the acid solution to the pentavalent state;
   (c) adding phosphoric acid and a tungstate salt soluble therein to the acid solution to form a phosphotungstate complex with the pentavalent vanadium in the solution; and
   (d) extracting the vanadium phosphotungstate complex from the acid solution in an aliphatic alcohol containing from 6 to 12 carbon atoms.

2. A method as defined in claim 1 wherein the vanadyl ions in the acid solution are oxidized to the pentavalent state by adding to the acid solution an oxidizing agent selected from the group consisting of alkali metal bichromates, alkali metal chlorates, and alkali metal permanganates.

3. A method as defined in claim 2 wherein the oxidizing agent employed is an alkali metal permanganate.

4. A method as defined in claim 1 wherein the pH of the acid solution is adjusted to between about −0.48 and about −0.85 prior to the addition thereto of the tungstate salt.

5. The method of claim 1 wherein the aliphatic alcohol is n-hexanol.

6. The method of recovering vanadium from vanadium-containing materials comprising:
 (a) dissolving the vanadium-containing material in an inorganic acid selected from the group consisting of sulfuric acid, hydrochloric acid, nitric acid and mixtures thereof;
 (b) oxidizing the vanadyl ions in the acid solution to the pentavalent state;
 (c) adding phosphoric acid and a tungstate salt soluble therein to the acid solution to form a phosphotungstate complex with the pentavalent vanadium in the solution;
 (d) extracting the vanadium phosphotungstate complex from the acid solution in an aliphatic alcohol containing from 6 to 12 carbon atoms; and
 (e) recovering the vanadium from the alcoholic extract phase.

7. The method defined in claim 6 wherein the vanadium is recovered from the alcoholic extract phase by removing the alcohol by distillation.

8. The method of claim 6 wherein the aliphatic alcohol is n-hexanol.

9. The method of removing vanadium from a vanadium-containing material which comprises:
 (a) dissolving the vanadium-containing material in an amount of sulfuric acid, which is from 3 to 8 times the stoichiometric amount required to convert all of the metal values present in the vanadium-containing material to sulfate salts;
 (b) heating the acid solution until white sulfur trioxide fumes are evolved;
 (c) oxidizing the vanadium in the acid solution to the pentavalent state by means of an oxidizing agent selected from the group consisting of alkali metal bichromates, alkali metal chlorates and alkali metal permanganates;
 (d) adding phosphoric acid to the acid solution in an amount which is from 4 to 8 times that which is stoichiometrically required to form a vanadium phosphotungstate complex with all of the vanadium in the solution;
 (e) adding water to the solution to adjust the pH therefrom about −0.48 to about −0.85;
 (f) adding a tungstate salt soluble therein to the acid solution in an amount which is from 2 to 4 times the stoichiometric requirement to form a phosphotungstate complex with all of the vanadium in the solution;
 (g) contacting the vanadium phosphotungstate complex-containing acid solution with the smallest amount of an aliphatic alcohol containing from 6 to 12 carbon atoms which is sufficient to extract substantially all of the vanadium phosphotungstate complex from the acid solution; and
 (h) segregating the organic alcohol phase from the acid phase.

10. A method for determining the vanadium content of a vanadium-containing material which comprises:
 (a) dissolving the vanadium-containing material in an inorganic mineral acid selected from the group consisting of sulfuric acid, hydrochloric acid, nitric acid and mixtures thereof;
 (b) removing any chloride ions present by volatilization;
 (c) oxidizing the vanadyl ions in the solution to the pentavalent state;
 (d) complexing the vanadium in the sample with phosphoric and tungstic acids;
 (e) extracting the vanadium phosphotungstate complex from the acid solution in an aliphatic alcohol containing from 6 to 12 carbon atoms; and
 (f) colorimetrically determining the vanadium content of the alcoholic extract.

11. A method as defined in claim 10 wherein the vanadium content of the alcoholic extract is determined spectrophotometrically using a wave length of from about 410 millimicrons to 450 millimicrons.

12. A method for determining vanadium, present as an impurity, in the range of from 4 parts per million to 150 parts per million in high purity aluminum metal which comprises:
 (a) dissolving the aluminum metal in a mixture of sulfuric, nitric and hydrochloric acid in which there is an excess of sulfuric acid over that required to convert all of the metal values in the solution of sulfate salts;
 (b) oxidizing the vanadyl ions in the solution to the pentavalent state;
 (c) adding an amount of phosphoric acid to the solution sufficient to form a phosphotungstate complex with all of the pentavalent vanadyl ions in the solution;
 (d) adjusting the total hydrogen ion normality of the solution to from about 3 M to 7 M by the controlled addition of phosphoric acid and water;
 (e) adding to the acid solution in an amount which exceeds the stoichiometric requirement to form a phosphotungstate complex with all of the vanadium in the solution, a tungstate salt which is soluble in the solution;
 (f) intimately contacting the acid solution with at least 3 milliliters for each milligram of vanadium present of an aliphatic alcohol containing from 6 to 12 carbon atoms to extract the vanadium phosphotungstate complex from the acid solution into the alcohol;
 (g) segregating the alcoholic extract phase from the acid phase; and
 (h) colorimetrically determining the amount of vanadium in the alcoholic extract.

13. A method as defined in claim 12 wherein the vanadyl ions in the solution are oxidized to the pentavalent state by
 (a) adding an oxidizing agent to the acid solution in an amount which slightly exceeds the amount required to oxidize all of the vanadyl to the pentavalent state and all other oxidizable ions to their highest state of oxidation obtainable with the oxidizing agent; and then
 (b) destroying the excess oxidizing agent.

14. The method defined in claim 13 in which the oxidizing agent employed is an alkali metal permanganate.

15. The method defined in claim 12 in which the tungstate salt added to the acid solution is sodium tungstate.

16. The method defined in claim 12 wherein the aliphatic alcohol employed is n-hexanol.

17. The method defined in claim 12 wherein the vanadium in said alcoholic extract is determined spectrophotometrically at a wave length of between 410 millimicrons and 450 millimicrons.

18. The method defined in claim 17 wherein the wave length employed is 436 millimicrons.

19. The method of removing vanadium from a vanadium containing material which comprises:
 (a) dissolving the vanadium-containing material in an inorganic mineral acid solvent containing sulfuric acid;
 (b) heating the acid solution until white sulfur trioxide fumes are evolved;
 (c) oxidizing the vanadium in the acid solution to the pentavalent state;
 (d) adding phosphoric acid to the acid solution in an amount which exceeds that which is stoichiometrically required to form a vanadium phosphotungstate complex with all of the vanadium in the solution;
(e) adding a tungstate salt soluble therein to the acid solution in an amount which exceeds that which is stoichiometrically required to form a phosphotungstate complex with all of the vanadium in the solution;
(f) contacting the vanadium phosphotungstate complex-containing acid solution with the smallest amount of an aliphatic alcohol containing from 6 to 12 carbon atoms which is sufficient to extract substantially all of the vanadium phosphotungstate complex from the acid solution; and
(g) segregating the organic alcohol phase from the acid phase.

20. The method of claim 19 wherein the aliphatic alcohol is n-hexanol.

21. The method of claim 19 wherein the aliphatic alcohol is n-heptanol.

22. In a method of removing vanadium from a vanadium-containing material by the steps of:
(a) dissolving the vanadium-containing material in an inorganic acid,
(b) oxidizing the vanadyl ions in the acid solution to to the pentavalent state,
(c) forming a vanadium phosphotungstate complex in the acid solution, the improvement which comprises extracting the vanadium phosphotungstate complex from the acid solution in an aliphatic alcohol containing from 6 to 12 carbon atoms.

References Cited

UNITED STATES PATENTS

| 1,747,403 | 2/1930 | Tilley | 23—19.1 |
| 2,130,579 | 9/1938 | Bowman | 23—19.1 |
| 2,211,119 | 8/1940 | Hixson et al. | 23—23 |
| 2,784,075 | 3/1957 | Bauerle et al. | 23—19.1 |
| 3,047,361 | 7/1962 | Hubbard et al. | 23—51 X |

OTHER REFERENCES

Hopps et al., Analytical Chemistry, vol. 24, No. 6, June 1952, pages 1050–1051.

Sandell, Industrial and Engineering Chemistry, Analytical Edition, vol. 8, No. 5, Sept. 15, 1963, pages 336–341.

Wright et al., Industrial and Engineering Chemistry, Analytical Edition, vol. 9, No. 6, June 15, 1937, pages 251–254.

OSCAR R. VERTIZ, *Primary Examiner.*

H. T. CARTER, *Assistant Examiner.*